INVENTOR.
DELMAR C. YOUNGS
BY Robert F. Fleming Jr.

ATTORNEY

# United States Patent Office 2,951,277
Patented Sept. 6, 1960

2,951,277

FABRIC HAVING CONTROLLED STRETCH

Delmar C. Youngs, Midland, Mich., assignor to Dow Corning Corporation, Midland, Mich., a corporation of Michigan Filed Dec. 4, 1958, Ser. No. 778,106

1 Claim. (Cl. 28—78)

This invention relates to woven fabrics having controlled stretch in one direction and especially to tapes made from such fabrics.

With the advent of silicone rubber a great impetus was given to improved electrical equipment. This is due to the increased thermal stability of silicone rubber which enables the operation of electrical equipment at high temperature and under humid conditions. Another reason for the widespread use of silicone rubber is because of the ease with which it can be applied to electrical apparatus. The most expeditious way is to apply the rubber in the form of tape which can be wrapped around coils and other electrical equipment. Heretofore this tape has been in two forms. One is the so-called "unsupported tape" which is composed entirely of silicone rubber without any reinforcing fibers or fabric. The other form is the so-called "supported tape" in which the silicone rubber is reinforced with a heat resistance fabric. This fabric serves to strengthen the tape and to improve its abrasion resistance.

In spite of the highly desirable properties of silicone rubber tapes their use as electrical insulation has been hampered by certain disadvantages. The unsupported tapes suffer from the disadvantage of poor mechanical strength and abrasion resistance. This makes it difficult to apply these materials from mechanical tape wrapping machines. The supported tapes on the other hand have the requisite mechanical strength and abrasion resistance but heretofore they have had insufficient elongation to produce homogeneous, wrinkle-free insulation. The inhomogeneity generally occurs when the tape is applied around sharp bends in coils or when the tape is lapped. In both cases it is necessary for part of the tape to stretch in order to compensate for the difference in curvature either at the lap or around the sharp bend. Heretofore employed supported tapes have lacked sufficient stretch to accommodate themselves to these conditions.

Because of this difficulty of application due either to lack of mechanical strength or lack of elongation the use of silicone rubber tapes has been limited. Consequently, there was a great need for a silicone rubber tape which will combine stretchability with mechanical strength and abrasion resistance. It is also important that the stretchability of the tape be controlled so that it will operate more efficiently on the mechanical taping machines presently in operation. Such a tape greatly expands the usefulness of silicone rubber insulation.

It is the object of this invention to provide a novel fabric having a controlled amount of stretch. Another object is to provide a novel silicone rubber tape which can be applied more economically to electrical equipment. Another object is to reduce the cost of silicone rubber insulation. Other objects and advantages will be apparent from the following description.

This invention relates to a fabric having a controlled amount of stretch in one direction comprising a woven fabric in which all of the yarn in one direction of weave is heat set prior to weaving and in which at least some of the yarn in the other direction of weave has been caused to contract by heat subsequent to weaving so that the fabric has shrunk in that direction at least 5%, the amount of contracted fibers extending in the direction of shrinkage being such that the fabric can be stretched from 5 to 25% by a force of less than 100 pounds per inch of width.

For the purpose of this invention the term "heat set" means either that the fibers of the yarn are insensitive to heat under conditions of fabrication and use (for example, glass or other siliceous fibers) or that the fibers have been heated prior to weaving to a temperature substantially above that at which the tape is to be fabricated or used thereby causing the fibers to be preshrunk and unaffected by subsequent heating at temperatures below that at which it was heat set. The later treatment must be given to those "heat set" fibers which are composed of organic plastics. For example, if the heat set fibers are of Orlon, they are first heated to a temperature of say 200° C. for a short period whereupon they shrink a given amount. After this treatment no shrinkage will take place when the yarn is heated at say 150° C. or any other temperature below 200.

The term "non-heat set" refers to organic plastic fibers which have not been "heat set" prior to weaving.

The fabrics of this invention are made by weaving fibers, some of which are heat set and some of which are not. For the purpose of this invention all of the yarn in one direction of weave is composed of heat set fibers while some of the yarn in the other direction of weave is composed of non-heat set fibers. When the fabric thus woven is subjected to heating the non-heat set fibers will contract thereby causing a crinkling of the fabric in the direction in which the non-heat set fibers run. The amount of contraction is controlled by the temperature and time at which the fabric is heated. For the purpose of this invention it is essential that the temperature-time relationship be such that the fabric will shrink at least 5% in the direction of the non-heat set fibers. It should be understood that the fabric can be made to shrink more than 5% by increasing the temperature or extending the time of heating. For the purpose of this invention, however, it is desirable that the amount of shrinkage be not greater than 25%.

When a force is applied to the shrunk fabric it will stretch an amount corresponding to the amount of shrinkage of the non-heat set fibers. In so stretching the fabric, the force applied works against the shrunk fibers only and the stretching will stop when the remaining fibers of the yarn (that is the heat set fibers) have straightened out (that is when all of the kink has been removed from the fabric). Any further stretching can be done only at the expense of rupturing the fabric which of course is not the object of this invention.

The amount of force required to stretch the shrunk fabric will depend upon the number of shrunk fibers running in the direction of the shrinkage. For the purpose of this invention it is essential that the number of fibers in the direction of shrinkage be such that the subsequent stretching can be accomplished by a force of less than 100 pounds per inch of width. That is, a one inch wide tape could be stretched from 5 to 25% by a force of less than 100 pounds while a two inch wide tape would require a total force of less than 200 pounds.

For a better understanding of the detailed construction of the fabrics of this invention recourse should be had to the accompanying drawings.

Figure 1:
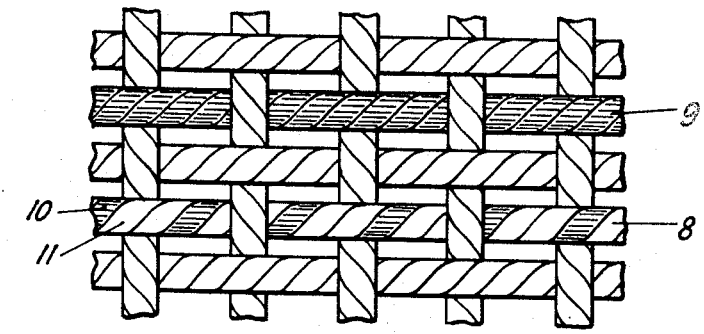
Figure 1 is a plan view of a section of fabric of this invention prior to heating in which all of the yarn in the vertical direction is made of heat set fibers (preferably glass) and in which the yarn in the horizontal direction is composed partially of non-heat set organic plastic fibers.
Figure 2:
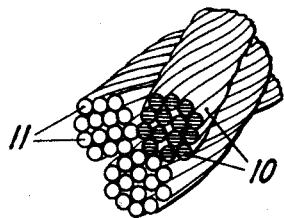
Figure 2 is a cross sectional view of yarn 8 of Figure 1.

Figure 1 represents one embodiment of this invention in which all of the yarn in the fabric is composed of three plies. In this particular embodiment the yarn in the vertical direction, that is the weft, is composed of three plies of glass fibers. However, in the horizontal direction, that is the warp, half of the yarn, represented by yarns 8 and 9, are composed at least in part of organic plastic fibers and the remaining yarn is composed entirely of glass fibers. In this particular embodiment of the invention two types of organic plastic yarn are employed in alternate positions. The yarn illustrated by 8 is composed of one ply 10 of plastic fibers and two plies of glass fibers 11. Figure 2 gives a detailed cross sectional view of this yarn.

Figure 3:
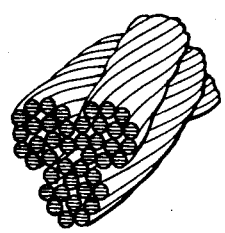
Figure 3 is a cross sectional view of yarn 9 of Figure 1.

The yarn, illustrated by 9, is composed entirely of three plies of organic plastic fibers. Figure 3 gives a detailed cross sectional view of this yarn.

Figure 4:
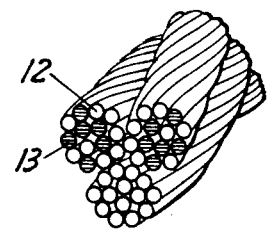
Figure 4 is a cross sectional view of a modified yarn of this invention.

It should be understood of course that various modifications of the fabric can be made without departing from the scope of this invention. For example, instead of having each ply of the yarn all plastic or all glass as in Figures 2 and 3 one may have yarn which is composed of plies some of which are entirely of glass and the others are partly of glass and partly of organic fabric. Figure 4 is a cross sectional view of such a yarn in which in two of the plies some of the individual fibers 12 are glass and some of the individual fibers 13 are organic plastic. Various other modifications of the fabric of this invention can be made. For example, the yarn can contain any number of plies and the plies can contain any desired number of fibers. Furthermore, instead of the fabric being a combination of glass and non-heat set plastic fibers it can be a combination of heat set organic plastic fibers and non-heat set organic plastic fibers. For example, in the above drawings all of the glass can be substituted with any heat set organic plastic fiber composed of, for example, polyacrylonitrile (Orlon), polyamides (nylon), copolymers of vinylchloride and vinylidene chloride (Saran), polyesters of terephthalic acid and ethylene glycol (Dacron) and the like. It should also be understood that in lieu of glass other siliceous fibers such as silica or asbestos can be employed.

Figure 5:
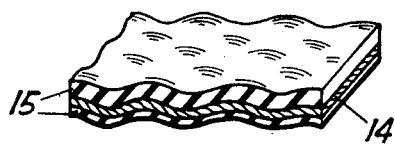
Figure 5 is a side view of an unstretched fabric which is coated with silicone rubber.
Figure 6:
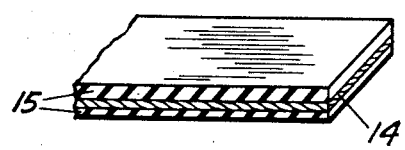
Figure 6 is a side view of the fabric of Figure 5 in stretched condition.

After the fabric has been woven in the manner above described it is then subjected to elevated temperature in order to produce shrinkage of the fabric in the direction in which the non-heat set organic plastic fibers extend. In general, this can be done by heating at from 200 to 400° F. Figure 5 shows one embodiment of such a shrunk fabric. This particular embodiment is composed of a fabric 14 which has been coated on both sides with silicone rubber 15. When the fabric is heated the shrinking causes it to crinkle as shown in the drawing. The heating of the fabric can be done either prior to or subsequent to coating with the silicone rubber. It is generally advantageous to heat subsequent to coating with the silicone rubber since this will cause the silicone rubber to cure and the fabric to shrink in one heating step. When this coated fabric is stretched it straightens out as illustrated in Figure 6. It is this stretching which produces the elongation of from 5 to 25% which is desirable in the process of this invention.

The fabric of this invention can be fabricated into tapes which are especially useful for wrapping electrical conductors. These tapes can be of any desired thickness or of any cross sectional configuration. For example, a tape made from the fabric of Figures 5 and 6 would be composed of one layer of fabric between two layers of silicone rubber. Other modifications of this tape can be made in which, for example, the silicone rubber is applied to only one side of the fabric. In essence such a tape would comprise a tape of silicone rubber having a backing of the shrunk fabric. If desired, multiple layers of fabric and silicone rubber can be made. However, for use on the tape winding machines, it is generally preferable to have a single layer of fabric in the tape.

Figure 7:
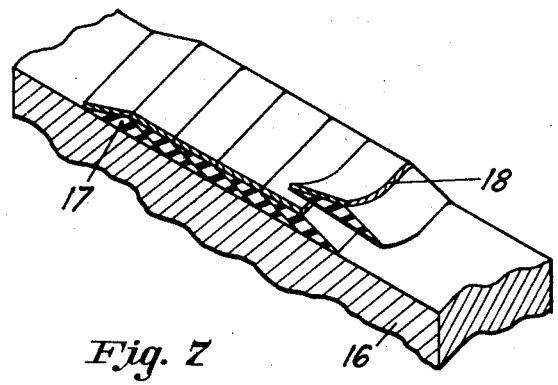
Figure 7 is a sectional view of an electrical conductor partially wrapped with a stretched triangular tape of this invention.

Furthermore, the tapes of this invention can be of any cross sectional configuration. A particularly desirable embodiment is shown in Figure 7 in which triangular silicone rubber tape 17 is backed on one side with the fabric 18 of this invention. This is a particular desirable embodiment since when such a tape is wrapped around an electrical conductor 16 in such a manner that the broad side of the silicone rubber tape is against the conductor and the side coated with the fabric is upward as shown in Figure 7, one obtains a unitary, smooth coating on the conductor which is protected from abrasion by the fabric covering. Furthermore, in the most preferred embodiment of this tape the silicone rubber is of the self-adhering type. When such a tape is employed in the manner shown in Figure 7, the layers of silicone rubber fuse into a unitary whole making a void-free sheath of silicone rubber insulation which is completely covered with the fabric. Because of the controlled stretch which is in the fabric, this type of tape can now be applied from a tape wrapping machine to provide a silicone rubber insulation in a manner more economical than heretofore obtainable.

It should be understood of course that materials other than silicone rubber, that is organic rubbers either synthetic or natural, or any other stretchable material can be employed in conjunction with the fabrics of this invention.

Furthermore, it should be understood that the materials of this invention can be used for uses other than electrical insulation. For example, they can be used in the fabrication of conduits for gases and liquids. In those cases in which the conduits are to be used for conveying organic liquids, it is preferable that the silicone rubber employed be of the low swell type.

In preparing the fabrics of this invention it is immaterial whether the thermoplastic non-heat set fibers extend in the direction of the warp or of the weft. Of course, in the fabrication of tapes from these fabrics it is necessary that the organic plastic non-heat set fiber extend in the long direction of the tape. If the fabric employed in making the tapes is especially woven for that purpose so that there is a selvage along the edge of the tape, then the organic plastic non-heat set fibers will extend in the direction of the warp. However, it is also possible to prepare the tapes of this invention from a fabric which has been woven with the organic plastic non-heat set fibers extending in the direction of the weft. In this case it is preferable to first coat the fabric with rubber in sufficient amount to bond it securely and thereafter curing the rubber and then cutting the fabric into strips of the desired width. The rubber will prevent the fabric from unraveling in spite of the fact that there is no selvage along the side of the tape.

The silicone rubber or other elastic material can be applied to the fabric in any suitable manner. That is, it can be applied by dipping, spraying or calendering or by molding in a pressure mold.

As mentioned above, the amount of shrinkage of the fabric is determined by the temperature at which it is heated. However, additional control over the amount of shrinkage can be obtained by mechanical means. For example, the fabric may be put in a frame which will allow it to shrink say 10%. Under these conditions only 10% shrinkage will be obtained regardless of the temperature. Controlled shrinking by mechanical means is also obtained by heating the fabric as it passes through rolls which are running at differential speeds thereby applying tension to the fabric and controlling the shrinkage.

The following examples are illustrative only of certain specific embodiments of this invention and should not be construed as limiting the invention which is properly delineated in the appended claims.

*Example 1*

The fabric employed in this example was a combination of glass fibers and fibers of a copolymer of vinyl chloride and vinylidene chloride which is sold under the name Saran.

Various fabrics were woven in each of which there were 57 picks per inch of glass yarn in the warp. This yarn was composed of three plies each of 450—1/2 glass fibers.

In each fabric there were 30 picks per inch of yarn in the weft. However, the composition of the yarn in the weft was changed as follows.

In the first fabric each yarn in the weft was composed of two plies of 450—1/2 glass fibers and one ply of single filament Saran fibers of 361 denier.

In the second fabric the weft was composed of Saran and glass in the ratio of 2 picks of yarn composed entirely of 450—1/2 glass fibers per 2 picks of yarn each composed of two plies of 450—1/2 glass fibers and one ply of the aforesaid Saran fibers.

In the third fabric the weft was composed of 6 picks of glass yarn composed entirely of 450—1/2 glass fibers per 2 picks of yarn composed entirely of the aforesaid Saran fibers.

In the fourth fabric the weft was composed of 4 picks of yarn composed entirely of 450—1/2 glass fibers per 2 picks of yarn composed entirely of the aforesaid Saran fibers.

In the fifth fabric the weft was composed of 2 picks of yarn composed entirely of 450—1/2 glass fibers per 2 picks of yarn composed entirely of the aforesaid Saran fibers.

Each of the fabrics was dipped into a 20% solvent dispersion of an unvulcanized silicone rubber having the formulation 100 parts dimethylpolysiloxane gum, 40 parts fume silica, 20 parts diatomaceous earth and 3 parts benzoyl peroxide. The fabric was air dried and heated in an oven 5 minutes at 300° F. This heat treatment vulcanized the silicone rubber and caused the fabric to crinkle and to shrink about 12% in the direction of the Saran fibers. Each of these fabrics was suitable for use as silicone rubber tape for wrapping electrical equipment and could be stretched 12% with a force of less than 50 pounds per inch of width.

*Example 2*

Fabric 1 of Example 1 was dip coated as described in that example and was then calendered on both sides with 15 mils of the silicone rubber stock of the aforesaid Currin-Paxton case. The calendered fabric was heated 5 minutes at 290 to 300° F. The resulting material could be stretched 12 percent with a force of 11.4 pounds per inch of width and was employed to insulate electrical coils.

*Example 3*

Another sample of fabric 1 was dipped into a 20% solution of the unvulcanized silicone rubber of Example 1 and air dried. The fabric was then heated 5 minutes at 300° F. to cure the rubber and to shrink the fabric. The fabric was then calendered on both sides with 15 mils of the self-adhering silicone rubber stock described in the aforesaid Currin and Paxton application. The calendered fabric was then cured 5 minutes at 300° F. It was then cut into tape ⅝ inch wide.

A triangular rubber tape was prepared by extruding the self-adhering silicone rubber formulation of the aforesaid Currin and Paxton application in triangular form so that the legs of the triangle were each ½ inch long. The calendered fabric tape was then applied to one side of the triangular tape corresponding to one of the legs as shown in Figure 7. This gave about a ⅛ inch overlap of the fabric. Since the fabric was coated with the self-adhering silicone rubber employed in the triangular base tape, the fabric fused to the latter. The resulting composite tape could be stretched 16% by the application of a force of less than 50 pounds per inch of width. This triangular tape can be wrapped around an electrical conductor employing a tape wrapping machine to give a void-free electrical insulation.

*Example 4*

Various modifications of the above procedure can be carried out. Thus one can use fibers of Orlon, nylon, Dacron, or organopolysiloxane fibers in place of the vinylchloride-vinylidene chloride copolymer shown above. In addition, one can employ natural rubber or GRS in place of the silicone rubber. The resulting tapes will have an elongation approximately the same as illustrated in the examples.

That which is claimed is:

A tape having a controlled amount of stretch in its long direction comprising a silicone rubber tape of triangular cross section supported by a woven fabric extending substantially the entire length of the tape and extending partly across the width of the tape so that only one side of the tape is covered, in said fabric all of the yarn extending along the width of the tape being composed of fibers which are heat set prior to weaving the fabric and at least some of the yarn extending along the length of the tape being composed of organic plastic fibers which have been caused to contract by heat subsequent to weaving the fabric so that the fabric has shrunk in that direction at least 5%, the amount of contracted organic plastic fibers extending in the direction of shrinkage being such that the tape can be stretched from 5 to 25% by a force of less than 100 pounds per inch of width.

References Cited in the file of this patent
UNITED STATES PATENTS
2,627,644    Foster _____ Feb. 10, 1953